US008863884B2

(12) United States Patent
Jacob-Lloyd

(10) Patent No.: US 8,863,884 B2
(45) Date of Patent: Oct. 21, 2014

(54) VEHICLE CHASSIS, VEHICLE BODY AND VEHICLE SUSPENSION

(75) Inventor: Roland Jacob-Lloyd, Warwickshire (GB)

(73) Assignee: Ricardo UK Ltd., West Sussex (GB)

( * ) Notice: Subject to any disclaimer, the term of this patent is extended or adjusted under 35 U.S.C. 154(b) by 183 days.

(21) Appl. No.: 13/318,570

(22) PCT Filed: May 6, 2010

(86) PCT No.: PCT/GB2010/000907
§ 371 (c)(1),
(2), (4) Date: Nov. 2, 2011

(87) PCT Pub. No.: WO2010/128297
PCT Pub. Date: Nov. 11, 2010

(65) Prior Publication Data
US 2012/0043152 A1 Feb. 23, 2012

(30) Foreign Application Priority Data
May 7, 2009 (GB) .................................. 0907880.9

(51) Int. Cl.
F41H 7/02 (2006.01)
B62D 21/04 (2006.01)
F41H 7/04 (2006.01)
B62D 33/067 (2006.01)
B60G 11/18 (2006.01)

(52) U.S. Cl.
CPC ................ B62D 21/04 (2013.01); F41H 7/042 (2013.01); B60G 2202/132 (2013.01); B62D 33/067 (2013.01); B60G 11/181 (2013.01); B60G 2204/122 (2013.01)

USPC ....... 180/299; 180/89.14; 180/312; 89/39.08; 280/800; 280/788; 280/107; 280/785; 296/187.07; 296/190.05

(58) Field of Classification Search
CPC ........... F41H 7/042; F41H 7/02; F41H 7/048; B62D 63/025; B62D 21/12; B62D 33/067
USPC ............. 180/89.1, 311, 312, 299, 298, 89.14; 89/36.08, 36.09; 280/781, 800, 788, 280/107, 785; 296/187.07, 190.05
See application file for complete search history.

(56) References Cited

U.S. PATENT DOCUMENTS 2,362,453 A * 11/1944 Cosper ........................ 180/89.15
3,578,377 A * 5/1971 Babbitt et al. ................ 296/102
(Continued)

FOREIGN PATENT DOCUMENTS

DE 19631715 * 2/1998
DE 19860562 A1 6/2000
(Continued)

OTHER PUBLICATIONS

International Search Report on Patentability, issued Aug. 4, 2010.
(Continued)

Primary Examiner — Katy M Ebner
Assistant Examiner — Emma K Frick
(74) Attorney, Agent, or Firm — Dority & Manning, P.A.

(57) ABSTRACT

A vehicle chassis in the form of a trough is 'V shaped and encloses the vehicle driveline and is resistant to ballistic and blast damage. The chassis has a removable body attached by longitudinal pivot pins. A torsion bar suspension is pivoted on the axis of the torsion bar.

18 Claims, 5 Drawing Sheets

(56) References Cited

U.S. PATENT DOCUMENTS

| | | | |
|---|---|---|---|
| 3,866,942 A | | 2/1975 | Dobeus et al. |
| 4,061,392 A | | 12/1977 | Lowder et al. |
| 4,097,958 A | * | 7/1978 | Van Dell .......................... 16/225 |
| 4,120,375 A | * | 10/1978 | Shinoda et al. ............. 180/89.14 |
| 4,141,429 A | * | 2/1979 | Hale ........................... 180/89.14 |
| 4,280,393 A | * | 7/1981 | Giraud et al. ............. 296/187.07 |
| 4,440,437 A | * | 4/1984 | Hahm et al. ............. 296/190.05 |
| 4,546,997 A | * | 10/1985 | Smyers ...................... 280/5.509 |
| 5,060,742 A | * | 10/1991 | Kuhlmann et al. ........ 180/89.14 |
| 5,833,269 A | | 11/1998 | Gastesi |
| 6,948,226 B2 | * | 9/2005 | Chernoff et al. ................. 29/428 |
| 7,195,307 B2 | * | 3/2007 | Tucker et al. ............. 296/190.05 |
| 7,441,809 B1 | * | 10/2008 | Coombs et al. ................. 280/785 |
| 7,594,561 B2 | * | 9/2009 | Hass et al. .................... 180/299 |
| 7,770,506 B2 | * | 8/2010 | Johnson et al. ............. 89/36.09 |
| 8,033,208 B2 | * | 10/2011 | Joynt et al. .................. 89/36.08 |
| 8,196,986 B2 | * | 6/2012 | Lorenzo et al. ............. 296/35.3 |
| 8,205,703 B2 | * | 6/2012 | Halliday ...................... 180/89.1 |
| 2006/0005695 A1 | * | 1/2006 | Honlinger et al. ........... 89/36.08 |
| 2007/0186762 A1 | * | 8/2007 | Dehart et al. ................ 89/36.09 |
| 2007/0234896 A1 | * | 10/2007 | Joynt .......................... 89/36.09 |
| 2008/0017426 A1 | * | 1/2008 | Walters et al. ............... 180/65.2 |
| 2008/0173167 A1 | | 7/2008 | Mills et al. |
| 2010/0102596 A1 | * | 4/2010 | Chapman ................. 296/193.03 |
| 2012/0174767 A1 | * | 7/2012 | Naroditsky et al. .......... 89/36.08 |

FOREIGN PATENT DOCUMENTS

| | | |
|---|---|---|
| EP | 0653344 A1 | 5/1995 |
| FR | 2179890 A1 | 11/1973 |
| JP | 10297547 A | 11/1998 |
| WO | WO 03102489 A1 | 12/2003 |
| WO | WO 2007/020531 A1 | 2/2007 |

OTHER PUBLICATIONS

GB Search Report, GB0907880.9, Aug. 24, 2009.

* cited by examiner

VEHICLE CHASSIS, VEHICLE BODY AND VEHICLE SUSPENSION

This invention relates to a chassis for a wheeled vehicle, to a vehicle body and mounting arrangements thereof, and to a novel vehicle suspension. The present inventions are particularly suitable for military vehicles, but also have non-military application.

Military vehicles have a number of special requirements including high mobility over rough terrain, adaptability of purpose, ease of maintenance and resistance to ballistic damage. Light vehicles have traditionally been adapted from four-wheel drive (4wd) road vehicles, and are poorly suited to military use in some respects.

Resistance to ballistic damage can be increased by the use of additional layers of protective material, which are generally applied to the existing vehicle structure. Protection against blast damage from below is typically by the use of armour plating on the vehicle underside. However the application of such blast protection is generally compromised by the complex underside shape of a conventional 4wd vehicle, and is at best a very shallow 'V' shape so as to minimize loss of ground clearance. Typically such additional protection is above the driveline.

A particular difficulty with conventional protection is that whilst blast damage can be resisted to some extent, the force of the blast may be sufficient to lift a vehicle high into the air leaving the occupants vulnerable to a hard landing. Even a modest blast may be sufficient to overturn a vehicle, leaving it immobile with the occupants at risk.

What is required is a vehicle better able to resist blast damage.

A second difficulty is that damaged light vehicles can be complex and awkward to repair in the field, since they are generally derived from road vehicles which are optimized for different circumstances of use. In particular chassis repair may require very substantial dismantling of the vehicle, and may thus be practically impossible to achieve in a field workshop.

What is required is an improved vehicle chassis better suited to field replacement.

Conventional 4wd vehicles generally have a rather open flat underside with major driveline components mounted below. Blast protection to the vehicle body typically leaves the driveline substantially exposed, so that a vehicle may be immobilized by blast damage thereto. In many cases effective shrouding of, for example, rigid axles, is not possible without seriously affecting articulation thereof. Furthermore such shrouding may prevent effective cooling and lead to mechanical failure due to overheating. A chassis adapted to protect major driveline components but which permits adequate cooling would be a significant advance.

Yet another difficulty relates to overall vehicle weight. A typical 4wd road vehicle is heavy (c. 2.5 tonnes) before the application of protective materials such as armour plating. The performance of the vehicle can be seriously compromised, and additional measures to deal with consequences can result in new problems. For example improved cooling arrangements for the engine, driveline and occupants may be difficult to site since conventional vehicles have optimized space utilization before adaptation to military use.

Suspension arrangements for 4wd vehicles can be complex in order to give good road holding and comfort. For a military vehicle a simple arrangement is acceptable especially if giving improved serviceability at a field workshop. One aspect of the present invention discloses such a suspension arrangement, which is particularly suitable for the improved vehicle chassis disclosed herein.

Military vehicles are expensive, and thus preferably adaptable to different circumstances of use. For example some different military applications are patrol, logistics and fire support. A vehicle which is easily adapted to different purposes would have significant advantages for a multi-role military force.

According to a first aspect, the present invention discloses a spine-type chassis of a vehicle, and comprising an open trough having substantially straight flanks closer together at the bottom than at the top, and adapted to receive an engine and transmission therein.

By transmission we mean the driveline components between the engine and the means of rotating the vehicle wheels, typically the drive shafts of a conventional differential and final drive gear. Thus all major driveline components, namely engine, multi-speed transmission and final drive gears are received within the trough chassis of the invention.

The chassis is preferably symmetrical, and the flanks thereof are preferably substantially flat. Most preferably the chassis is substantially 'V' shaped in section, having an included angle of less than 100°, preferably less than 75°, and most preferably less than 60°. The apex of the 'V' may be rounded in order to give improved ground clearance. In the preferred embodiment no significant horizontal surfaces are provided, such as would provide lift of the vehicle in the event of a blast.

The chassis preferably has a substantially constant section throughout the length thereof.

Typically the maximum width of the chassis is less than 70% of the track of a vehicle for which it is intended.

Such a chassis is inherently adapted to protect engine and transmission from blast damage, and furthermore to better resist vehicle lift and rollover by deflecting the blast from the angled flanks. The trough is adapted as a duct to make maximum use of cooling fluid forced therethrough, for example from a fan and/or air conditioner blowing cooled air to a rear facing exhaust.

A chassis according to the invention preferably has substantially closed ends, and can thus be inherently rigid yet inexpensive to manufacture. The end enclosures may be angled upwardly and outwardly. The upper side of the trough preferably includes body mountings adapted to receive a driver module which may incorporate a load carrier. The load carrier may comprise a passenger compartment.

Furthermore, the chassis of the invention may be adapted to receive an engine module, as will be further explained. Such a chassis is inherently adapted to straightforward inexpensive replacement by removal of engine and driver modules, and remaining driveline components.

The chassis according to the invention, if containing a mechanical driveline, requires openings for drive shafts for the vehicle wheels. Such openings must permit drive shaft articulation in the vertical plane, but are close to the vehicle centreline by virtue of the trough shape of the chassis, and are accordingly relatively small for a given deflection at the wheel. Whilst blast damage may remove a wheel and associated suspension components, it is envisaged that progress by the remaining three wheels could be maintained by virtue of the usual limited slip differential gears. The chassis may further include blast projector shields below such openings and angled upwardly and outwardly from the chassis flanks. The trough chassis may include a top cover to further stiffen chassis and to provide additional protection to a driver module.

The chassis of the invention is particularly suited to contain a fuel tank, for example a flexible or moulded main fuel tank, which needs no separate armoured protection. Such a fuel tank is preferably positioned between a conventional gearbox/transfer box and the rear axle, and below the upper edge of said chassis. Thus the chassis of the invention contains all components necessary for providing motive power, except wheels, drive shafts and steering linkage which must necessarily lie outboard of the chassis; as a direct result the number of apertures provided in the chassis wall is limited, and accordingly strength and blast resistance thereof is increased, and the manufacturing cost reduced.

In a preferred embodiment the chassis is adapted to receive a driver module thereon, said module comprising lower side portions directed inwardly so as to fit substantially flush with the flanks of the chassis. In this way the width of the module is progressively increased as a continuation of the chassis so that the lower side portions and flanks provide a substantially flush surface at an angle to the vertical. The driver module may have lower side portions at differing angles. Thus in a preferred embodiment the included angle within the wheel region is narrower than in the region between the wheels. Such an arrangement gives greater clearance for escape of the pressure pulse and debris following a blast from a mine.

The driver module is preferably connected to the chassis via the long upper edges thereof so as to pivot about a fore and aft longitudinal axis in the manner of a hinge. The connection is preferably via spaced annular mountings of the chassis and driver module, said mountings being adapted to receive a pivot or securing pin therethrough.

In a preferred embodiment each pivot pin is removable, to permit the driver module to be readily disengaged from the chassis. The annular mountings may comprise a tube having an internal cylindrical bush of resilient material, and within which a securing pin can be inserted. Such an arrangement allows isolation of the driver module from noise and vibration of the chassis, whilst also permitting pivoting of the driver module for maintenance of the driveline.

The use of longitudinal pin-type mountings with resilient bushing also permits manufacturing tolerances to be accommodated, and slight misalignment due to damage in use. Field workshop maintenance and replacement of driver module is thereby facilitated.

The driver module preferably substantially closes the rearmost portion of the chassis trough, so as to enclose the driveline from above.

The invention further comprises an assembly of a spine-type chassis according to the invention, and a driver module.

In such an assembly, the driver module has a substantially flat underside, and all components within the chassis aft of the engine bell housing lie below the upper edge thereof. Thus the driveline is fully enclosed, and the trough forms a highly effective duct for cooling fluid, such as cold air from a fan or air conditioner. In this way the driveline can be cooled. Suitable apertures for cooling air can be provided at the front and rear, or through the driver module.

The driver module typically consists of a drivers position and a load carrier to the rear thereof. The load carrier is typically a passenger compartment, but may be a weapons mount, a communications centre or other modular unit such as a fire pump.

The use of a separate driver module permits armoured projection to be optimized at minimum cost and weight. For example the chassis may comprise blast-proof armour plating, whereas the driver module may have blast-proof lower side portions, but upper side portions and roof adapted to resist ballistic damage.

In a further preferred embodiment, the chassis is adapted to receive an engine module therein, said engine module comprising a sub-frame, adapted to receive an engine, armoured side portions positioned so as to fit substantially flush with the flanks of the chassis and cheek compartments outboard said side portions.

The armoured side portions are positioned to enclose and protect the engine, whereas the cheek compartments provide mudguards and are adapted to enclose non-critical components. Thus the weight and amount of armouring can be minimized, and loss of non-critical components in the event of blast or ballistic damage can be tolerated. Such non-critical components may consist, for example, of exhaust muffler, air intake assembly, engine emissions control equipment and lights.

The cheek compartments preferably include underside portions angled downwardly and inwardly so as to minimize blast damage.

In a preferred embodiment the engine module further includes a top closure to cover the space between the armoured side portions, and optionally also the cheek compartments. Preferably the top closure is armoured, and the module further includes an armoured front wall. Such a module with engine is adapted for testing as a complete sub-assembly, and for fitting directly to the chassis of the invention.

Typically the engine module will thus comprise engine cooling including radiator, electrical supply, high level fuel tank and clutch/gearbox assembly.

According to a further aspect of the invention there is provided a torsion bar suspension for a vehicle and consisting of a suspension arm having an inboard end pivoted to a chassis, an outboard end adapted for attachment to a wheel carrier, and a torsion bar extending orthogonally of the suspension arm and anchored on the chassis, wherein the torsion bar lies on the inboard pivot axis of the suspension arm.

Such an arrangement allows the torsion bar to operate in pure torsion, without any bending forces.

Typically one end of the torsion bar has a splined connector to the suspension arm on the pivot axis therefrom and a pivot bearing is provided between the torsion bar and the chassis immediately adjacent the splined connection, preferably adjacent the non-active end of the torsion bar.

A splined connection allows adjustment of pre-load, but other kinds of non-rotatable connection are also suitable.

A torsion bar suspension is particularly adapted to the chassis of the present invention. Preferably the chassis is provided with upper and lower links for each wheel carrier, said links being respectively mounted adjacent the upper and lower edges of the trough by suitable flanges. The torsion bar is arranged longitudinally immediately adjacent a flank of the chassis, and is thus protected from blast damage to some extent, and may be relatively easily shrouded.

The inner suspension arm mountings may be inboard the chassis, particularly for a top arm, so as to allow the torsion bar to be inside the trough and thus inherently protected from blast damage. By providing the inner mounts inboard of the chassis, they are less likely to suffer from blast or impact damage, and thus allow a suspension unit to be replaced without repair of the mounting.

As with drive shafts, the size of opening in the chassis flank for an inboard mounting of suspension arm is small, bearing in mind the closeness of the pivot axis to the chassis flank.

In the preferred arrangement upper and lower wishbones are provided as suspension arms, the side of the wishbone closer to the vehicle centre being the torsion bar mount, and the pivot provided by said mount being on the inner side of the wishbone.

Preferably the front suspension has rear facing torsion bars, and the rear suspension has forwards facing torsion bars so as to permit wheel placement towards the longitudinal extremities of the chassis.

Other features of the invention will be apparent from the following description of a preferred embodiment shown by way of example only in the accompanying drawings in which.

Figure 1:
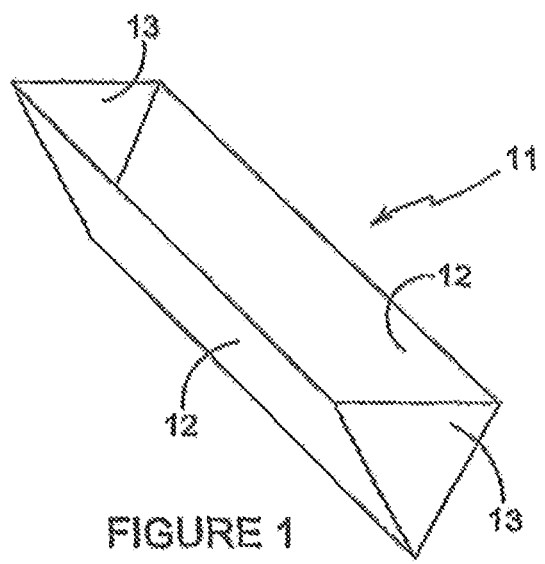
FIG. 1 is a schematic three-quarter view from above, of a chassis according to one aspect of the invention.

FIG. 1 illustrates the vehicle chassis of the invention in schematic form. The chassis 11 comprises an open trough having a 'V' cross-section so that the flanks 12 are flat and angled upwardly and outwardly. End walls 13 complete the chassis, which is typically a welded steel fabrication. Such a chassis is inherently rigid and inexpensive to construct. Cross-members and bulkheads (not shown) may be provided to connect the flanks internally.

Figure 2:
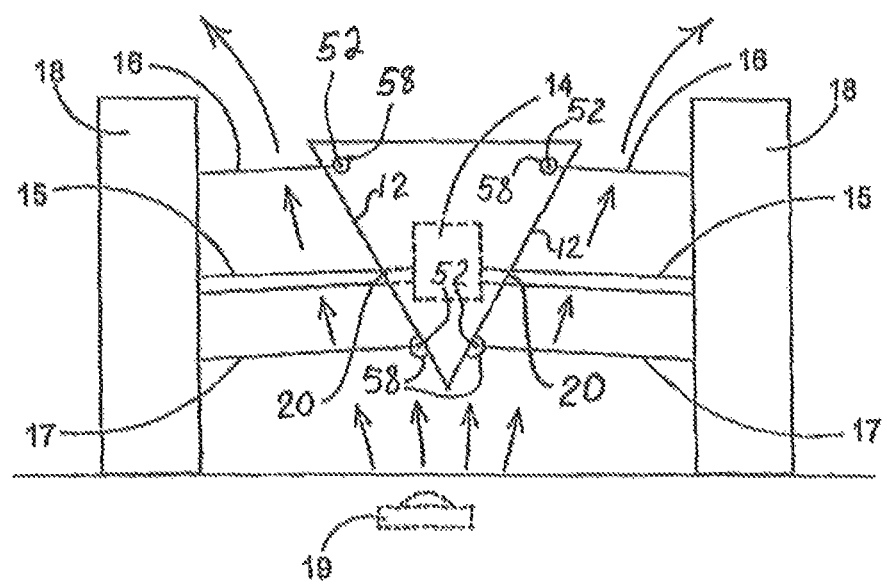
FIG. 2 is an end view of the chassis of FIG. 1 illustrating a preferred suspension arrangement.

FIG. 2 shows an illustrative arrangement with internal differential final drive gear 14, drive shafts 15, upper and lower suspension arms 16, 17 and wheels 18. It will be readily understood that an upward blast from a mine 19 or the like will be deflected to either side of the chassis so as to escape through the gap between the wheels and the chassis, as represented by the arrows. Forces acting to lift and/or overturn the vehicle are minimized.

Suitable apertures 20 are provided for a steering linkages, which may be on all axles; such linkages are typically a simple tie rod to each wheel carrier/hub 30 the steering gear itself being located within the chassis.

As illustrated in FIG. 2, the lower suspension articulation is outside the chassis, whereas the upper articulation is inside the chassis. Suitable apertures 20 and mounting points are provided.

Figure 3:
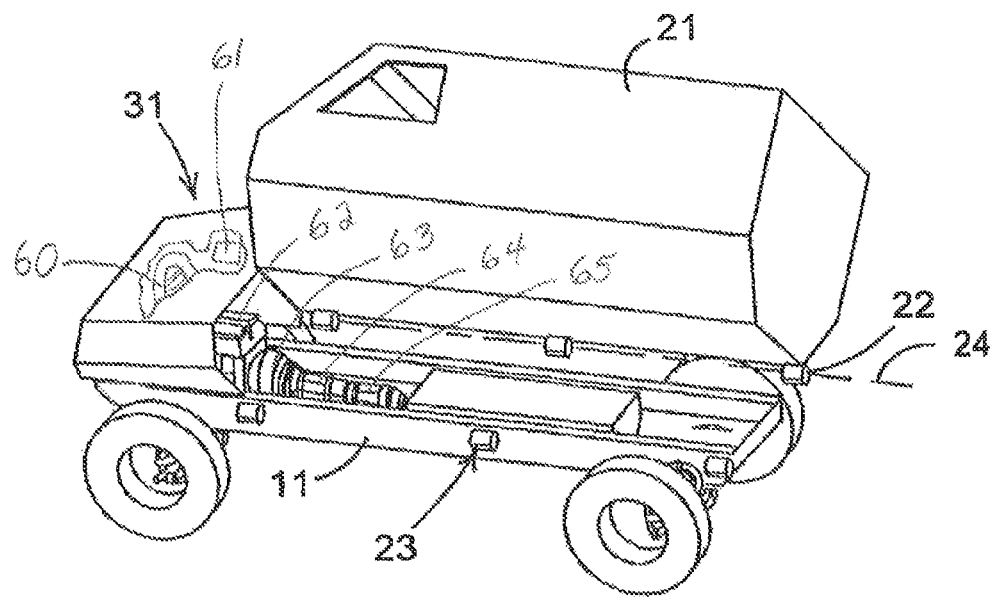
FIG. 3 shows a complete vehicle incorporating the chassis of FIG. 1.

FIG. 3 illustrates a vehicle incorporating chassis 11, and having a driver module 21 attached to the upper side of the chassis by co-operating tubular mounts 22, 23. It will be appreciated that such mounts permit tipping of the module to one side to give access to the interior of the chassis, and permits easy removal and replacement of the module. The mounts are provided immediately adjacent the longitudinal outside edge(s) of the trough so as to facilitate manufacture and maintain the trough opening at the maximum size.

Figure 4:
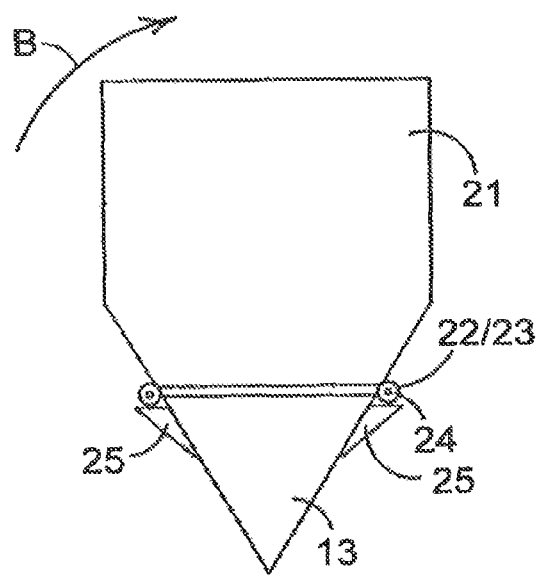
FIG. 4 is a rear end view of the vehicle of FIG. 3 showing schematically the drivers module and chassis.
Figure 4A:
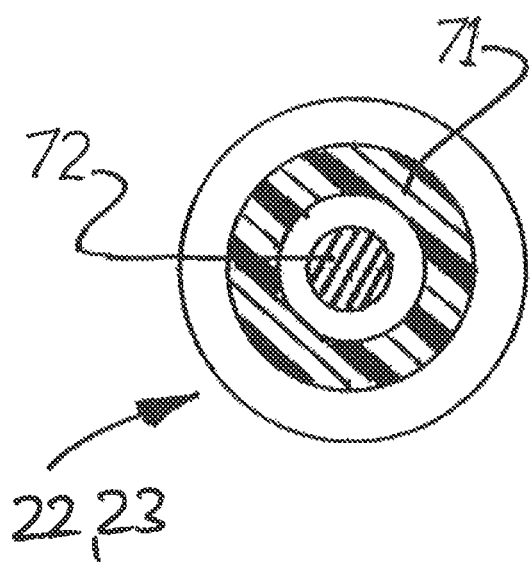
FIG. 4A is an enlarged rear end view of components depicted in FIG. 4 showing schematically the pin and bushing.

In the preferred embodiment the mounts 22, 23 schematically shown in an enlarged view in FIG. 4A for example include cylindrical elastomeric bushings 71 to insulate the module 21 from noise and vibration, and to allow a degree of compliance for fitting. Suitable pins 72 (FIG. 4A) pass through adjacent mounts 22, 23 for fixing.

In use the module 21 is arranged for tipping to one side so that electrical connections and the like can be placed on or close to the tipping axis 24 via one or more suitable multi-connectors. Such an arrangement avoids the need for disconnection during maintenance, yet allows such connections to be grouped for easy disconnection should the module 21 require separation from the chassis 11. Typically such connections are at the front of the vehicle. Typically a change of driver module may take less than two hours.

The lower side walls of the module are tapered inwardly so as to fit flush with the sides of the chassis, as represented in FIG. 4. This arrangement avoids presenting an obstructing surface to the blast, and permits the module to be relatively lightly armoured. The module tips open about axis 24, as represented by arrow 'B'. FIG. 4 also illustrates protection shields 25 angled outwardly and upwardly below the mounts 22, 23. Similar shields can be provided for other protuberant shapes which might be susceptible of blast damage.

A driver module may consist of a two man crew area at the front, and a four man passenger module at the rear. The module can have a flat floor by virtue of the look of vertical intrusion of the driveline aft of the bell housing, thus easing movement within the module. Furthermore the flat floor of the driver module allows relatively easy encasement of the drive line, so that the occupants are protected from driveline components in the event of severe blast damage. A bulkhead, preferably armoured may be provided between crew and rear portions of the driver module, thus further increasing strength of the driver module, and resistance to potential damage and injury.

Also shown in FIG. 3 is an engine module 31 consisting of a sub-frame for attachment of engine 42, cooling pack 60, fuel supply 62 and electrical supply 61, an engine cover and cheek compartments 45 at either side. Such a module can be tested as a complete unit off a vehicle and quickly mounted thereon by connecting the sub-frame to the chassis, and making the necessary electrical and fuel connections. The engine module may include a clutch 63 and gearbox 64/transfer box 65 so that driveline connections are simplified. Typically a change of engine module may take less than one hour.

Figure 5:
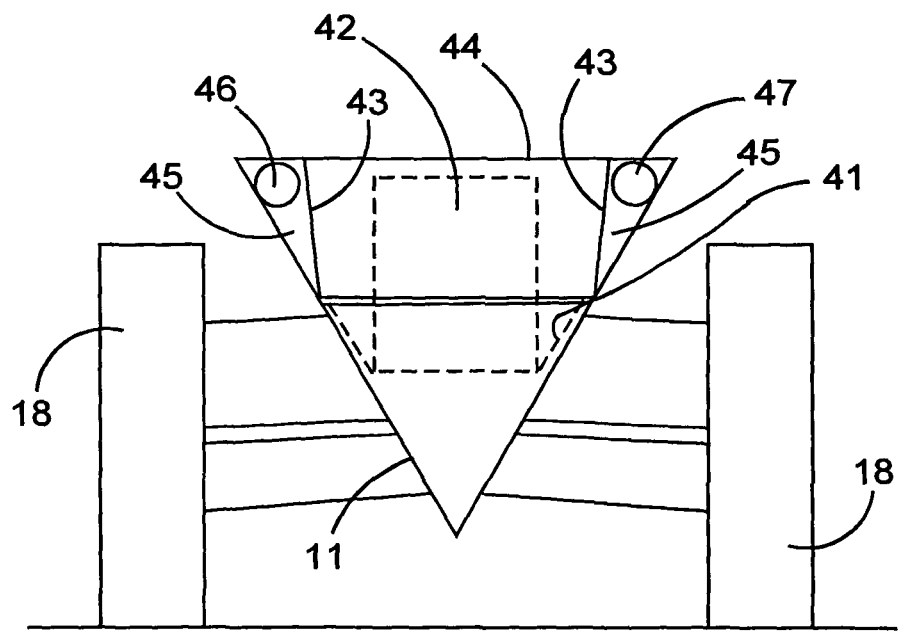
FIG. 5 is a front end view of the vehicle of FIG. 3 showing schematically an engine module and chassis.

With reference to FIG. 5, the sub-frame 41 and engine 42 are represented in dotted line. The sub-frame includes armoured side and front panels 43 immediately adjacent the engine, and an armoured engine cover 44 extending over the entire upper surface.

The cheek compartments 45 are typically lightly armoured on the side and wider surfaces, and contain components such as air intake assembly 46 and exhaust/muffler 47.

Such an arrangement ensures that vital engine parts are heavily protected whereas loss of non-vital parts in the event of blast damage is confined to the side pods 46, which can be readily replaced. All parts are protected from ballistic damage from above by the engine cover. It is envisaged that loss of side pods and associated parts will not disable the vehicle.

Figure 6:
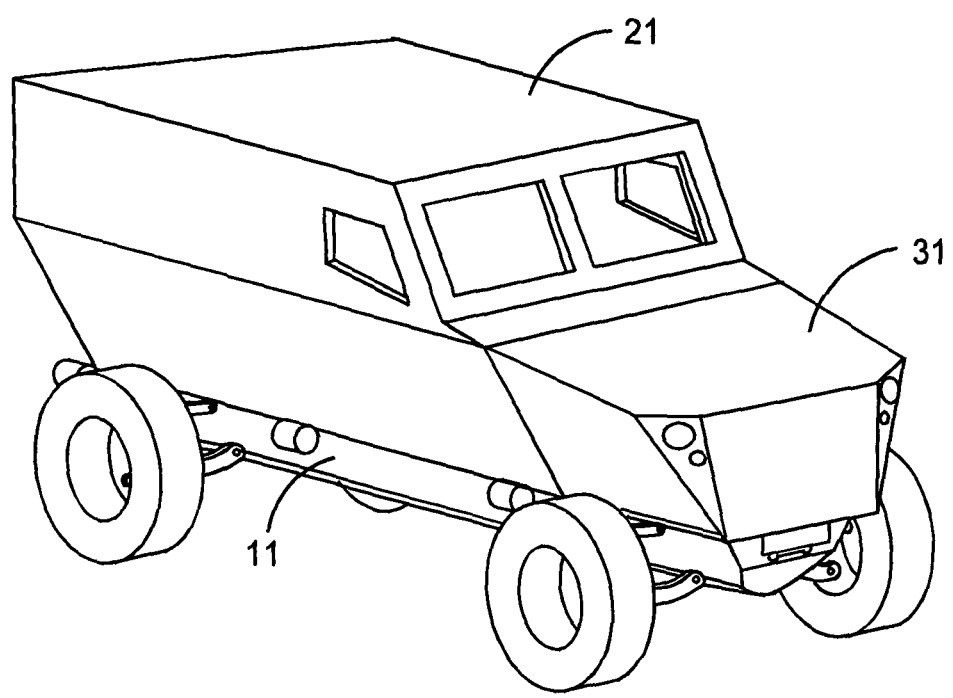
FIG. 6 is a front three-quarter view of a complete vehicle incorporating the invention.

FIG. 6 illustrates a typical complete vehicle showing a tapering side profile provided by flush fitting surfaces of the chassis 11, driver module 21 and engine module 31.

Figure 7:
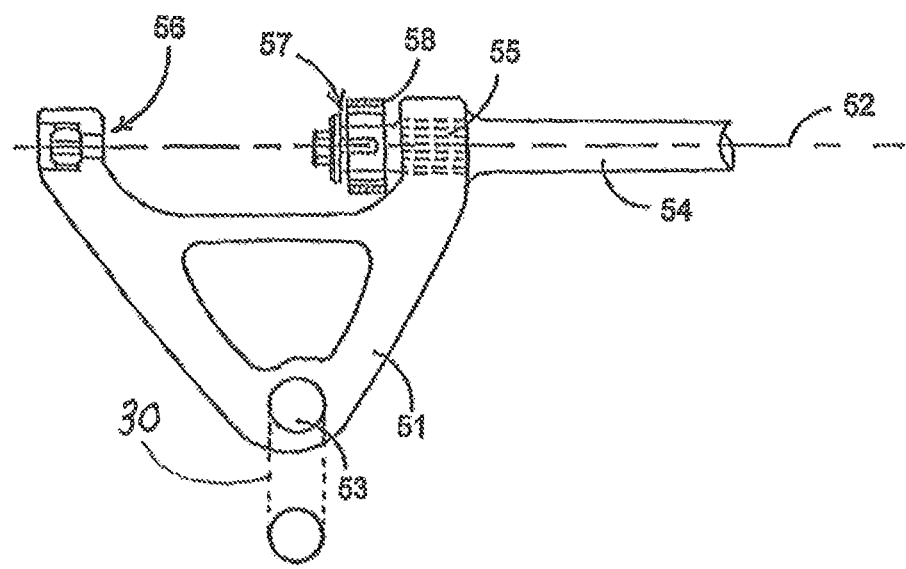
FIG. 7 illustrates a torsion bar suspension according to another aspect of the invention.

FIG. 7 illustrates a torsion bar suspension particularly suitable for the chassis 11, and consisting of a wishbone suspension arm 51 having an inner pivot axis 52 and an outer mount 53 adapted to receive a wheel carrier 30.

In use resistance to up and down movement about the pivot axis 52 is by a torsion bar 54 anchored on the chassis and lying on the axis 52. Connection to the wishbone is via a splined link 55, and the free end of the wishbone 51 also provides a pivot pin of the wishbone.

Such an arrangement is compact and simple, and may be tuned for changes in load by relative rotation of the splined link 55. With reference to FIG. 2 it can be seen that the pivot axis 52 may be inboard or outboard the chassis flanks 12.

FIG. 7 also illustrates the inboard wishbone pivot bearings 56, 57 which lie on the axis 52, and a typical mount 58 of the chassis.

Although the invention has been described in relation to a military vehicle, the chassis of the invention is suitable for non-military uses, especially where rapid replacement is a desirable attribute.

The invention claimed is:

1. A combination spine-type chassis and driver module in a four-wheel drive vehicle, said four-wheel drive vehicle having an engine and a transmission disposed aft of the engine and connected to be driven by the engine, said combination comprising:

the chassis defining an open trough having two substantially straight flanks, the two flanks disposed opposed to each other closer together at the bottoms of the flanks than at the tops of the flanks, the top of one of the flanks defining one of the opposite sides of the open mouth of the trough, the top of the other one of the flanks defining the other one of the opposite sides of the mouth of the trough, the trough being configured to receive the transmission therein, the bottoms of the flanks of the trough defining an apex that defines an included angle of no more than 100°;

the chassis having at least a air of chassis mounts, said chassis mounts being tubular, spaced apart from each other and axially aligned with each other along a mounting axis that is disposed adjacent the top of one of said flanks of said trough;

the driver module having at least a pair of driver module mounts, each said driver module mount being spaced apart from the other driver module mount, each driver module mount being, disposed adjacent a respective one of the chassis mounts and axially aligned with and axially spaced apart from the respective chassis mount along the mount axis, each respective driver module mount and respective adjacent chassis mount being selectively connected by a removable pin permitting pivoting of said driver module relative to said chassis about said mounting axis; and wherein said driver module having a substantially flat underside selectively disposed across the mouth of the trough, wherein the substantially flat underside and the flanks of said trough selectively define a duct that houses the transmission aft of the engine for cooling the transmission.

2. The chassis of claim 1 and having substantially flat flanks and the apex having a substantially 'V' section with an included angle of 75° or less.

3. The combination chassis and driver module of claim 2, wherein lower side portions of said driver module are angled inwardly thereof, and flush with said flanks.

4. The combination chassis and driver module of claim 1 wherein said driver module includes annular driver module mounts, each respective annular driver module mount for coupling with a respective one of the chassis mounts of said chassis by a respective removable pin insertable on said respective mounting axis.

5. The combination chassis and driver module of claim 4, wherein a respective tubular elastomeric bush is disposed intermediate each respective mount and pin.

6. The combination chassis and driver module of claim 1 and further including an engine mounting module comprising a sub-frame, armoured side panels, cheek compartments outboard of said side panels and an armoured top cover extending over said cheek compartments.

7. The combination chassis and driver module of claim 6 and further including in said engine mounting module, an engine, a cooling pack, a fuel supply, an electrical supply, a clutch and a gearbox, such that said engine mounting module is capable of independent operation.

8. The combination chassis and driver module of claim 1 and further including a wheel suspension comprising a suspension arm pivoted thereto about a pivot axis at the inner end and adapted to receive a wheel carrier at the outer end, and a torsion bar connected to said suspension arm on said axis and anchored on said chassis.

9. The combination chassis and driver module of claim 8 wherein said pivot axis is inboard said chassis.

10. The combination chassis and driver module of claim 8 wherein said wheel suspension comprises upper and lower suspension arms for connection to respective upper and lower links of a wheel carrier, the upper suspension arm having said torsion bar.

11. The combination chassis and driver module of claim 1 and having four wheels, said chassis including therein a driveline for said wheels comprising a transfer gearbox and two final drive gears, said chassis further including apertures in said flanks for respective drive shafts for said wheels.

12. The combination chassis and driver module of claim 1 wherein at least a third tubular chassis mount is axially aligned on a second mounting axis adjacent the top of the other one of said flanks of said trough and at least a third tubular driver mod mount is axially aligned on the second mounting axis adjacent the top of the other one of said flanks of said trough, the third tubular chassis mount including a further axially removable pin aligned with said second mounting axis.

13. The combination chassis and driver module of claim 1, wherein the driver module includes a drivers position and a load carrier disposed to the rear of the drivers position.

14. The combination chassis and driver module of claim 13, wherein said load carrier is one of a weapons mount, a passenger compartment, a communications module or a fire pump.

15. The combination chassis and driver module of claim 1, further comprising a fan carried by the chassis and disposed for passing air through said duct for cooling said transmission.

16. The combination chassis and driver module of claim 1, wherein said trough has substantially closed ends.

17. The combination chassis and driver module of claim 1, further comprising a respective suspension arm is provided for carrying each wheel, and a respective torsion bar is connected to each respective suspension arm, each respective torsion bar extending orthogonally of the respective suspension arm and arranged alongside and immediately adjacent and outside a flank of the chassis.

18. A combination spine-type chassis and driver module in a four-wheel drive vehicle, said four-wheel drive vehicle having an engine and a transmission disposed aft of the engine and connected to be driven by the engine, said combination comprising:

the chassis defining an open trough having two substantially straight flanks, the two flanks disposed opposed to each other closer together at the bottoms of the flanks than at the tops of the flanks, the top of one of the flanks defining one of the opposite sides of the open mouth of the trough, the top of the other one of the flanks defining the other one of the opposite sides of the open mouth of the trough, the trough being configured to receive the transmission therein, the bottoms of the flanks of the trough defining an apex that defines an included angle of no more than 100°;

the chassis having at least a pair of chassis mounts, said chassis mounts being tubular, spaced apart from each other and axially aligned with each other along a mounting axis that is disposed adjacent the top of one of said flanks of said trough;

the driver module having at least a pair of driver module mounts, each said driver module mount being spaced apart from the other driver module mount, each driver module mount being disposed adjacent a respective one of the chassis mounts and axially aligned with and axially spaced apart from the respective chassis mount along the mounting axis, each respective driver module mount and respective adjacent chassis mount being selectively connected by a removable pin permitting pivoting of said driver module relative to said chassis about said mounting axis;

the chassis having substantially flat flanks and the apex having a substantially 'V' section with an included angle of 75° or less;

wherein lower side portions of said driver module are angled inwardly thereof, and flush with said flanks; and wherein the lower side portions and said flanks are coplanar.

* * * * *